US012654245B2

(12) United States Patent
Geilert et al.

(10) Patent No.: US 12,654,245 B2
(45) Date of Patent: Jun. 16, 2026

(54) METHOD FOR DRESSING A MULTI-FLIGHT WORM GRINDING WHEEL FOR GRINDING TEETH OR SIMILAR PROFILES

(71) Applicant: KAPP NILES GMBH & CO. KG, Coburg (DE)

(72) Inventors: Philip Geilert, Ahorn (DE); Christopher Goebel, Ahorn (DE); Jan Senftleben, Meeder (DE)

(73) Assignee: KAPP NILES GMBH & CO. KG, Coburg (DE)

( * ) Notice: Subject to any disclaimer, the term of this patent is extended or adjusted under 35 U.S.C. 154(b) by 553 days.

(21) Appl. No.: 18/036,239

(22) PCT Filed: Oct. 29, 2021

(86) PCT No.: PCT/EP2021/080200
§ 371 (c)(1),
(2) Date: May 10, 2023

(87) PCT Pub. No.: WO2022/101038
PCT Pub. Date: May 19, 2022

(65) Prior Publication Data
US 2023/0398620 A1      Dec. 14, 2023

(30) Foreign Application Priority Data
Nov. 12, 2020     (DE) ..................... 10 2020 129 935.4

(51) Int. Cl.
*B23F 23/12*        (2006.01)
*B23F 21/02*        (2006.01)

(52) U.S. Cl.
CPC ........ *B23F 23/1225* (2013.01); *B23F 21/026* (2013.01)

(58) Field of Classification Search
CPC ... B23F 23/1225; B23F 21/026; G05B 19/042
See application file for complete search history.

(56) References Cited

U.S. PATENT DOCUMENTS 6,302,764 B1     10/2001   Wirz
10,788,810 B2     9/2020   Hörburger
(Continued)

FOREIGN PATENT DOCUMENTS

DE            4413229 A1    12/1994
DE          19901338 C1     3/2000
(Continued)

OTHER PUBLICATIONS

International Search Report of PCT/EP2021/080200 Dated Feb. 22, 2022, 3 Pages.

*Primary Examiner* — Chad G Erdman
(74) *Attorney, Agent, or Firm* — LUCAS & MERCANTI, LLP; Klaus P. Stoffel

(57)          ABSTRACT

A method for dressing a multi-thread grinding worm for the grinding of toothings, wherein the grinding worm includes a plurality of worm threads that are each dressed by a dressing tool with at least one dressing stroke to provide the grinding worm with a desired profile. The method includes: a) dressing a first worm thread, wherein at least one process parameter is measured and recorded during the dressing process; b) dressing a further worm thread, wherein the process parameter is measured and recorded during the dressing process; c) after dressing all worm threads: combining the recorded data of the process parameter; d) comparing the combined data of the process parameter with data stored in a machine controller and checking whether the combined data are within a predefined admissible range; e) outputting a signal if the combined data are not within the predefined admissible range.

11 Claims, 6 Drawing Sheets

(56)  References Cited

U.S. PATENT DOCUMENTS

2020/0189016 A1     6/2020  Schweizer
2022/0134459 A1*    5/2022  Dietz ..................... B23F 1/023
                                                    451/5

FOREIGN PATENT DOCUMENTS

DE     102007009359  A1    8/2008
DE     102014019553  A1    6/2016
DE     102017121344  A1    3/2019
DE     102018131915  A1    6/2020
WO       2020193228  A1   10/2020

* cited by examiner

METHOD FOR DRESSING A MULTI-FLIGHT WORM GRINDING WHEEL FOR GRINDING TEETH OR SIMILAR PROFILES

CROSS-REFERENCE TO RELATED APPLICATIONS

The present application is a 371 of International application PCT/EP2021/080200, filed Oct. 29, 2021, which claims priority of DE 10 2020 129 935.4 filed Nov. 12, 2020, the priority of these applications is hereby claimed and the applications are incorporated herein by reference.

BACKGROUND OF THE INVENTION

The invention relates to a method for dressing a multi-thread grinding worm for the grinding of toothings or similar profiles, wherein the grinding worm comprises a plurality of worm threads, each of which are dressed by means of a dressing tool with at least one dressing stroke in order to provide a desired profile to the grinding worm.

Grinding by means of a grinding worm is often used for fine machining, especially in the production of gears. The grinding worm has several parallel worm threads. During grinding, the worm threads engage with the gear teeth to be ground.

Precise profiling of the grinding worm is decisive for the quality of the gear to be produced. In the case of a grinding worm that has abrasive material in a dressable base body, the geometry of the contact surfaces with the gear teeth is produced by a dressing process. Accordingly, in this case (in distinction to a grinding worm having a steel base body covered with abrasive material), the grinding worm is dressed both prior to the manufacturing process and also at appropriate manufacturing intervals to eliminate wear-related negative changes in the profile of the grinding worm.

The dressing process is illustrated schematically in FIG. 1. The grinding worm 1 is shown, which has several worm threads 2, 3 that run parallel to each other around the axis of rotation of the grinding worm 1. Furthermore, a dressing tool 4 can be seen, which is mounted on a dressing spindle 5, which is driven by a motor not shown. Also shown is an unspecified dressing tool which is mounted on the dressing spindle 5 together with the dressing tool 4 and which is used to dress the outer circumference of the grinding worm 1 (the "tip circle").

During dressing, the dressing tool 4 is guided through the individual worm threads 2, 3 of the grinding worm 1 one after the other in order to profile them. FIG. 1 shows the relevant parameters, such as the diameter do of the grinding worm 1, the diameter d R of the dressing tool 4, the speed ns of the grinding worm 1 during dressing, the speed n R of the dressing tool 4 during dressing, the relative translation speed v fad between the grinding worm 1 and the dressing tool 4 during dressing and the radial infeed a ed with which the dressing tool 4 is fed radially relative to the grinding worm 1. Also noted is the coordinate Y, which indicates the location of the dressing tool 4 relative to the grinding worm 1 during the dressing process.

The dressing is usually carried out in several dressing strokes, whereby first roughing strokes can be carried out to produce the possible shape of the flanks of the individual worm threads, which are then followed by finishing strokes that produce the final contour of the flanks of the worm threads. The individual dressing strokes can be carried out in such a way that one flank of the worm thread is dressed in an outward stroke and the opposite flank of the worm thread is dressed in a subsequent return stroke. Between the outward stroke and the return stroke, the dressing tool can then be shifted in direction Y (positive shifting during the outward stroke, negative shifting during the return stroke).

For monitoring the dressing process, it is known to monitor in particular the current of the motor with which the dressing spindle is driven. The current is recorded and its course is observed over time. A permissible interval is defined for this course, i.e. an upper and lower envelope curve, whereby the current must lie within the interval in order to be able to assume a proper dressing process.

Due to the continuous grinding and dressing of the grinding worm, its diameter decreases. The changes in diameter or rotational speed are also reflected in the current consumption of the dressing motor. As a result, it is possible to leave the envelope curve mentioned, although the dressing process is still completely normal. Therefore, it is also known to take this into account in a changing envelope curve ("adaptive envelope curve"). I.e. in the course of the various dressing processes, the envelope curve is also adapted.

One problem is that in some error constellations, the quality of the dressing process cannot be reliably concluded with the previously known measures. This is particularly true in the case of partial chipping of the grinding worm. With the previously known methods, a problematic dressing process is occasionally already concluded here, while the grinding worm can still be used, possibly with certain restrictions. This results in higher tool costs and also higher manufacturing costs due to tool changes.

DE 10 2018 131 915 A1 deals with the object of determining the quality of a dressable grinding worm. For this purpose, the dressing tool is in contact with the grinding worm to be dressed after the dressing process has been carried out, with at least one signal being measured and evaluated while said contact is present between the dressing tool and the grinding worm. Specifically, it is provided that a tip region of the worm thread is moved during contact with a region of the dressing tool. In this case, an area of the dressing tool on the outside diameter side contacts the tip of the worm thread of the grinding worm. According to this previously known solution, an inspection of the already dressed grinding worm is therefore concerned after the dressing process has been carried out.

From WO 2020/193228 A1 it is known to carry out a process control during the grinding process of workpieces by means of a grinding worm. For this purpose, at least one measured variable is monitored during the machining of the workpieces, whereby it is provided that a warning indicator for an impermissible process deviation is determined from the at least one monitored measured variable. In particular, the detection of a grinding wheel chipping is considered here.

SUMMARY OF THE INVENTION

The invention is based on the object of further developing a generic method in such a way that it is possible, by means of improved monitoring of the dressing process, to obtain more reliable information as to whether the dressing process of the grinding worm was still sufficient to be able to use the worm or whether further measures must be taken (further dressing or worm change) in order to ensure the grinding of good parts. Thus, one objective of the present invention is to monitor the dressing process in a process-safe manner.

The solution of this object by the invention provides that the method comprises the steps:

a) dressing a first worm thread with the dressing tool by at least one dressing stroke, wherein at least one process parameter is measured and detected during the dressing process;

b) dressing of a further worm thread, which is different from the first worm thread, with the dressing tool by at least one dressing stroke, wherein the process parameter is measured and detected during the dressing operation;

c) after dressing all worm threads of the grinding worm: combining the measured and recorded data of the at least one process parameter;

d) comparing the combined data of the at least one process parameter with data stored in a machine controller and checking whether the combined data is within a pre-determined admissible range;

e) outputting a signal if the combined data is not within the predefined admissible range.

The dressing is preferably performed in several dressing strokes, wherein the data measurement and data acquisition is only performed for selected dressing strokes, preferably only for the last executed dressing stroke.

The at least one process parameter is preferably measured and recorded over the path of the dressing stroke. Although recording over time is also possible, recording over the path of the dressing stroke can improve the assignment to the location on the grinding worm where a problematic area is located.

The process parameter is preferably the amperage of a drive motor used to rotate a dressing spindle that carries the dressing tool.

However, it is also possible that alternatively or additively the process parameter is the dressing work related to the removed material of the grinding worm (measured in J/mm³), which is required for a dressing stroke at least for a defined section of the grinding worm. By means of the recorded path covered by the dressing tool relative to the grinding worm during dressing and the radial infeed of the dressing tool relative to the grinding worm, the volume of material (in mm³) removed by the dressing tool from the grinding worm in the corresponding worm thread can be determined. Correspondingly, the energy (in J) can be determined by the current consumption of the motor that drives the dressing spindle and the corresponding time to cover said distance, and from this then said quotient (in J/mm³).

The power or current consumption of the dressing spindle can therefore be used to determine the energy absorbed for a defined time, which is required for cutting the material of the grinding worm. Taking into account the geometry of the dressing tool and the profiling of the worm thread as well as the process parameters (in particular the infeed of the dressing tool onto the grinding worm), the corresponding machined volume can then be determined. With the afore-mentioned parameter of the cutting energy per volume, the transferability between different dressing processes with different grinding worms is facilitated.

Furthermore, it can be alternatively or additively provided that the process parameter is the structure-borne sound or the sound emission, which is detected by a structure-borne sound or acoustic sensor during a dressing stroke.

The above-mentioned combining of the measured and recorded data of the at least one process parameter is, in the simplest case, the addition of the signals.

The comparison of the above combined data may include a comparison with at least one predetermined and stored maximum or minimum value. In this case, it is particularly intended that the comparison is made for a predetermined section of the grinding worm.

It is also possible that several process parameters are taken into account; examples of this were mentioned above.

From the at least one process parameter, a characteristic value can be determined and output which characterises the dressing process of the grinding worm. In this respect, a characteristic value can be defined for each dressed grinding worm, which provides information about the dressing process that has been carried out.

In this respect, it is then an index-based process monitoring. The dressing process can be evaluated via a numerical value (range: e.g. 0 to 100); "0" then means: "no abnormalities", "100" means: "process faulty—processing must be stopped".

The indices can be calculated using a predefined algorithm. The input for the algorithm can then be project data from the current machining job as well as various drive signals from the machine control, such as in particular the current consumption of the dressing spindle and the tool axis, power signals and speeds. Furthermore, signals from an installed structure-borne sound sensor system and a permanently installed acceleration sensor system can be used. The sampling rates are preferably in the range of several hundred Hertz. The signals can be adaptively filtered.

When we speak here of the current consumption (I) of the motors, we are of course also referring to the absorbed power (P) of the motors, which can be calculated via the relationship $$P = \overline{P} = \frac{1}{T} \int_{t_0}^{t_0+T} u \cdot i \, dt$$

which is given when voltage U is applied.

The assessment can also be carried out by reverting to data stored (in the machine control) and thus learned knowledge from previous dressing processes. Process deviations (anomalies) can thus be detected more easily, so that the machine operator can be given a warning or the dressing process can be aborted.

During machining, as the case may be several signals internal to the control system (i.e. those present in the machine control system) and also signals external to the control system (e.g. recorded via sensors that pick up structure-borne noise, which originates from the machine bed or the hall floor, for example) are recorded and taken into account.

In addition, machine-internal data (such as set corrections, the diameter of the dressing tool and the grinding worm, generated paths along which the dressing tool and the grinding worm are guided relative to each other) can be used to assess the process, for which they are adaptively filtered and sorted if necessary (for example, by dividing the entire dressing process into different strokes).

For a general validity of the determined data for different dressing processes and thus for the transferability, the mentioned characteristic values can be standardised.

With the help of algorithms from statistics and in particular with algorithms from the field of machine learning, these data are evaluated and the quality of the editing process is determined. The well-known algorithms from the field of machine learning include both supervised and unsupervised learning, "deep learning" and "reinforcement learning".

This makes it possible to increase the monitoring quality of the dressing process and thus stabilise the dressing process. It can be recognised in an improved manner whether the dressing process is faulty, whereby the type of fault can also be identified in an improved manner. The prerequisite for this is that such an error or a similar error has been taught in the data stored (in the machine control).

The proposed approach thus monitors the dressing process and assesses it on an index basis. This means that for each dressing process an index, i.e. a numerical value, is calculated that assesses the quality of the dressing process. These index values can then be made available to the machine operator as a progress diagram, so that he can easily get an overview of the dressing processes that have taken place in each case. Several characteristic values can be used to determine the aforementioned index. These characteristic values then assess the dressing process in different ways. Errors can thus be detected at an early stage, which would otherwise only be detected with delay or not at all. These include, in particular, errors in the form of chipping on the grinding worm.

The data recorded in the actual dressing process is compared with data stored in a database. In this way, for example, certain process signals can be assigned to certain areas of the grinding worm; correspondingly, for example, signals can be assigned to certain worm diameters and associated rotational speeds of the grinding worm.

BRIEF DESCRIPTION OF THE DRAWING

The drawing shows examples of embodiments of the invention.

DETAILED DESCRIPTION OF THE INVENTION

Figure 1:
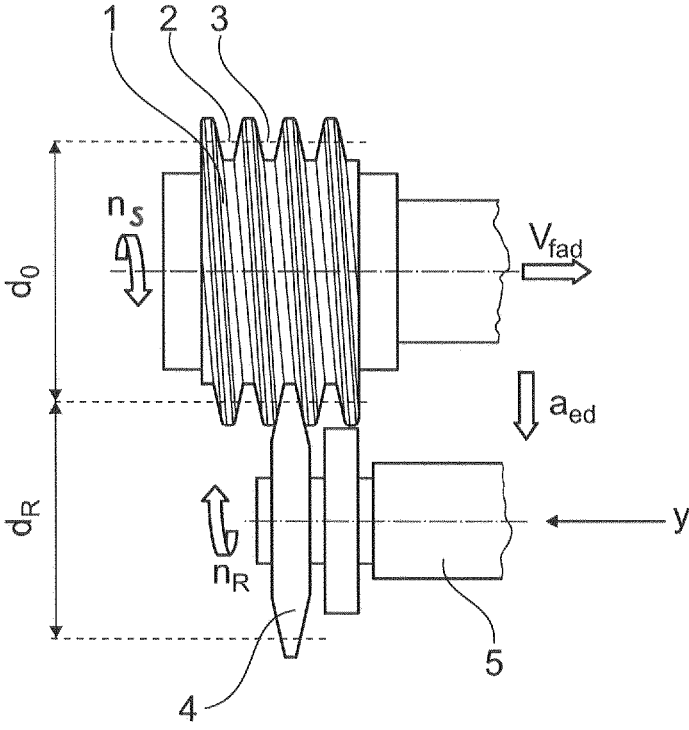
FIG. 1 schematically shows a grinding worm that is dressed with a dressing tool, FIG. 2 schematically shows the course of a process parameter in the form of the dressing work per volume of material removed by the grinding worm for three dressing strokes, whereby the course is shown during dressing of a first worm thread, FIG. 3 schematically shows the course of the process parameter according to FIG. 2 for two dressing strokes, whereby the course is shown during dressing of a second worm thread.
Figure 2:
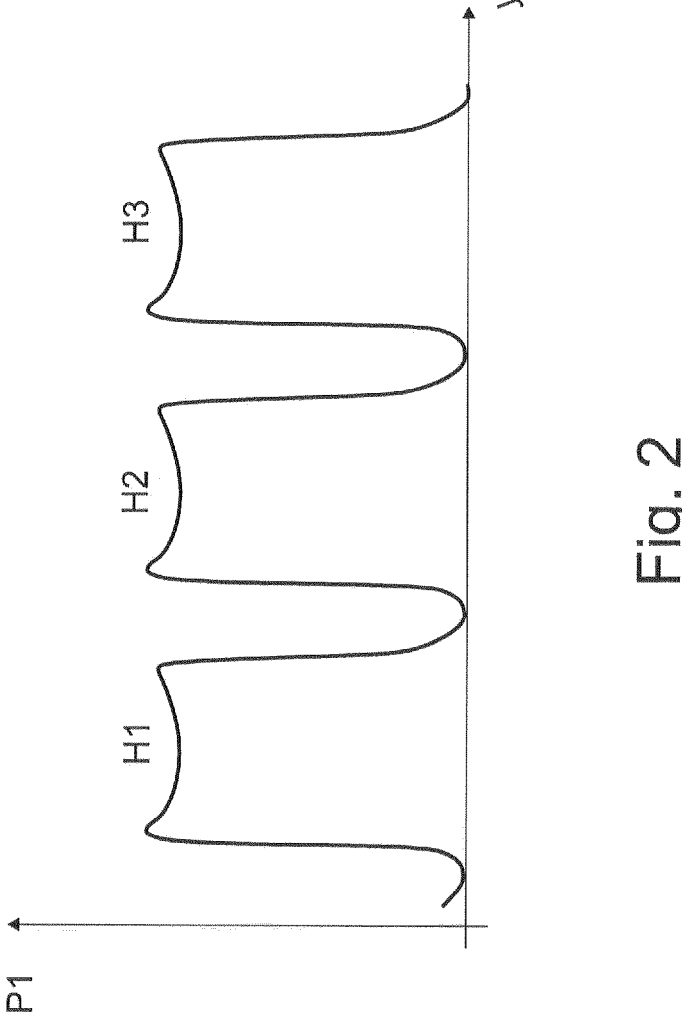

FIG. 2 schematically shows the course of a process parameter P1 over the path of several dressing strokes H1, H2, H3, which results from the dressing of a first worm thread 2 (see FIG. 1).

Thus, the dressing of the first worm thread 2 with the dressing tool 4 is shown (see FIG. 1), whereby the process parameter P1 is measured and recorded during the dressing process.

The process parameter here is the dressing work related to the removed material of the grinding worm 1 (its unit is $J/mm^3$), which is required for a dressing stroke H1, H2, H3 at least for a defined section Y of the grinding worm 1. For clarification, it should be noted that the course of the dressing work for different dressing strokes H1, H2, H3 is plotted here over the coordinate Y, although forward and backward movements are usually provided for each dressing stroke (outward stroke, backward stroke) or the coordinate Y is traversed anew.

It should be mentioned that for a given radial feed of the dressing tool 4 relative to the grinding worm 1, at least at a constant traversing speed v fad (see FIG. 1), there is a proportionality between the dressing work and the current absorbed by the motor of the dressing spindle 5 or the power of the motor.

As can be seen from FIG. 2, the process parameter P1 values are within an expected range.

Figure 3:
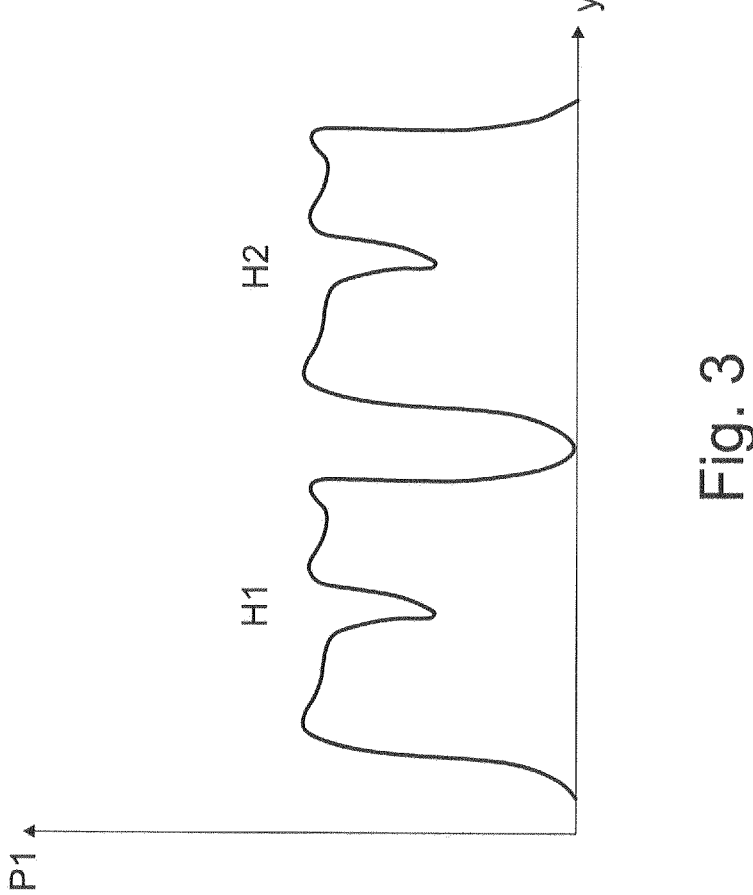

FIG. 3 schematically shows the course of the process parameter P1 over the path of two dressing strokes H1 and H2, which results from the dressing of a second worm thread 3 (see FIG. 1).

Thus, the dressing of a further worm thread 3 with the dressing tool 4 is shown, whereby the process parameter P1 is again measured and recorded during the dressing process.

It can now be seen that the conditions here are obviously no longer optimal, because the course of the process parameter P1 shows a dip approximately in the middle of the upper plateau, on which the process parameter P1 typically lies during a dressing stroke, which indicates a chipping on the grinding worm 1.

Figure 4:
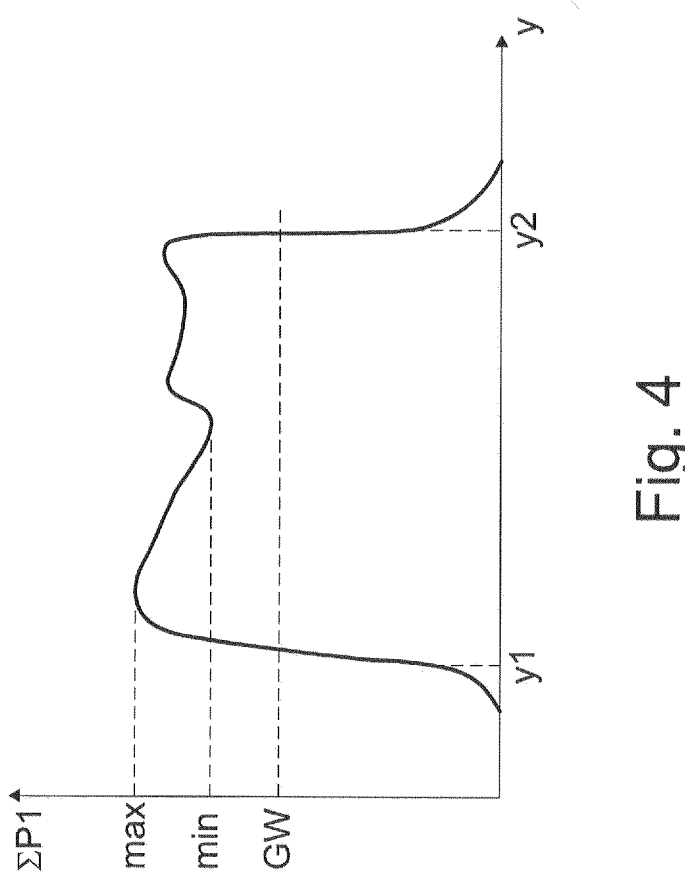
FIG. 4 shows schematically the course of the process parameter according to FIG. 2 and FIG. 3 for a dressing stroke, whereby the sum of the values of the process parameter is shown and whereby an acceptable dressing process of the grinding worm has still been carried out.

After all worm threads have been dressed, the measured and recorded data of the process parameter P1 are merged. This is shown in FIG. 4. In the present case, the values of the process parameter P1 were added up, whereby a simple assignment of the individual dressing strokes in the respective worm thread 2, 3 can be carried out by simultaneously logging the coordinate Y.

FIG. 4 shows that the relatively strong dip in the middle of a dressing stroke (see FIG. 3) is still noticeable, but is less pronounced.

Now a comparison of the combined data of the process parameter P1 data stored in a machine control not shown and a check whether the combined data is within a predetermined permissible range is carried out.

For this purpose, a coordinate Y1 and a coordinate Y2 are indicated in FIG. 4, between which the evaluation takes place. Accordingly, the observation takes place between defined areas that can easily be determined automatically (e.g. by a certain size of the gradient with which the curve shown in FIG. 4 rises at the beginning of the dressing stroke (coordinate Y1) and a certain size of the gradient with which the curve falls at the end of the dressing stroke (coordinate Y2)).

For the evaluation range defined in this way, maximum values "max" and minimum values "min" of the course of the curve of the process parameter can be determined automatically.

FIG. 4 also shows a limit value GW, which in this case marks the stored minimum permitted value of the process parameter P1.

Accordingly, the software in the machine control can easily recognise here that nowhere (between the coordinates Y1 and Y2) has the value fallen below the limit value GW and thus—despite a chipping at the grinding worm—the dressing process can still be judged as proper.

For example, depending on the difference between the values "max" and "min" and on the relative position to the limit value GW, a characteristic value can be calculated that provides information about the quality of the dressing process. For example, a characteristic value of "100" can be assigned to a form of the summed course analogous to FIG. 2 ("optimal conditions during dressing"), while deductions from the value "100" are defined when the value "min" approaches the limit value GW, indicating that the optimal range has been left.

Figure 5:
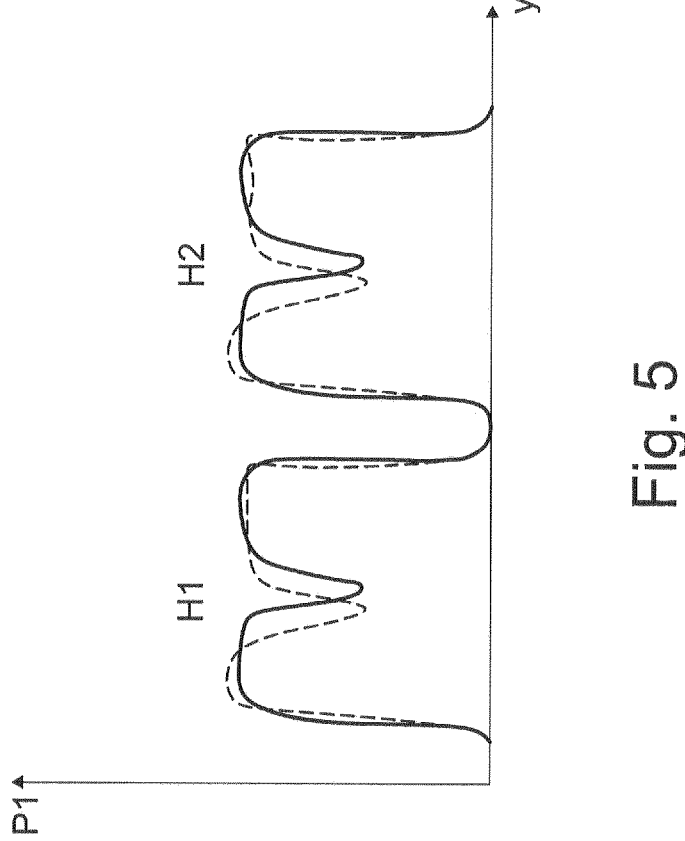
FIG. 5 shows schematically the course of the process parameter in the form of the dressing work per volume of material removed by the grinding worm for two dressing strokes, whereby the course during dressing of a first worm thread (with drawn-out lines) and the course during dressing of a second worm thread (with dashed lines) are shown.

FIG. 5 illustrates an analogous example in which the individual dressing strokes (two dressing strokes H1 and H2 are shown) in the respective worm threads 2, 3 led to the curves of the process parameter P1 shown. The course of the dressing of the first worm thread 2 is shown with drawn-out lines, the course of the dressing of the second worm thread 3 is shown with dashed lines.

It can now be seen that in both worm threads 2, 3 there is a drop in the process parameter P1 approximately in the middle of the upper plateau, which in turn indicates a chipping in the grinding screw.

Figure 6:
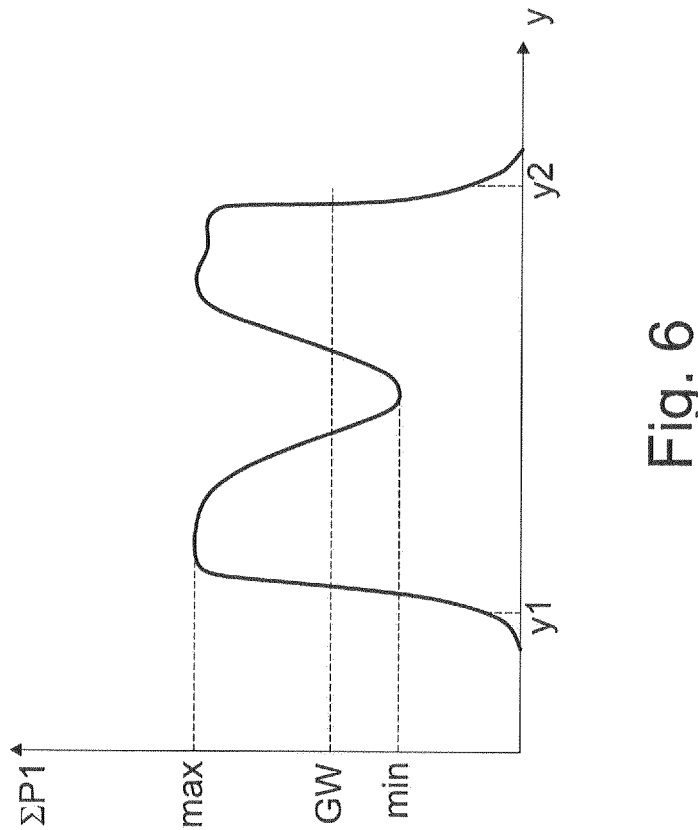
FIG. 6 shows schematically the course of the process parameter according to FIG. 5 for a dressing stroke, whereby the sum of the values of the process parameter is shown and whereby no more acceptable dressing operation of the grinding worm was carried out.

If the values of the process parameter P1 recorded in the individual worm threads 2, 3 are added up, the result is the curve as shown in FIG. 6. It can be seen here that there is a sharp drop in the summed values of the process parameter P1 in the middle area of the upper plateau, so that an analogous evaluation can also be carried out for this curve as described in connection with FIG. 4.

Here, too, there is now a maximum value "max" as well as a minimum value "min", although the minimum value "min" is now below the limit value GW and thus indicates that the dressing process was no longer carried out properly.

Accordingly, a warning can now be issued to the machine operator that the dressed grinding worm no longer has a proper profile and cannot be used. This means that a signal is given that the combined data is no longer within the specified permissible range.

Again, of course, a characteristic value can be determined that quantifies the error that has occurred and thus allows the machine control or the machine operator to assess whether the production process can or should be continued despite less than optimal conditions during dressing.

This procedure allows the dressing process to be characterised: If the damage only occurs in a single worm thread, the effects on the entire process are relatively small. This is then also reflected in the combined signal of all worm threads (according to FIG. 4 or FIG. 6). With the signal combination, several dressing strokes of a worm thread or several worm threads of the grinding worm are combined by the described calculation.

The fault patterns can thus be determined in a more differentiated manner; namely, circulating faults over several worm threads can be distinguished from a local outbreak within one worm thread. If several worm threads are damaged, this also has an effect on the combined signal. This can be taken into account for the index calculation of the process.

In the embodiment, as mentioned, the dressing work related to the removed material of the grinding worm 1 was used as the process parameter P1. However, it is possible that other or different process parameters are also considered here in an analogous manner. All parameters that are suitable for characterising the dressing process are suitable.

In particular, characteristic values can be used which are sensitive to the dressing process, for which reference is made to the above explanations (e.g. recording of the structure-borne sound, which also allows statements about the course of the dressing process). As shown, only sections of the recorded process parameters (in this case: the values between the coordinates Y1 and Y2) can be used.

As also mentioned above, it is particularly possible to weight the dressing strokes of a worm thread differently. The first roughing strokes can usually be weighted lower than the last roughing strokes and in particular the finishing strokes that produce the quality-critical surface of the grinding worm.

Rotary encoders and linear scales of the machine can be used to assign the values of the process parameter P1 to the current location of the dressing tool relative to the grinding worm. In this way, it is possible to easily observe any faults on the grinding worm as a function of the different dressing strokes and worm speeds.

After the dressing process is characterised by the calculation of the mentioned index (characteristic value), various messages can be sent to the machine operator or reactions can be made as to how to proceed if the limit value GW is exceeded:

The damaged axis position Y can first be output to the machine operator according to a first option. In addition, the machine can automatically move the grinding worm with the damaged area to a defined position (e.g. in front of the dressing device) to allow the operator a quick and efficient visual inspection.

According to a second option, the machine operator can select whether dressing should continue until the error is eliminated (i.e. until the index reaches a predefined value, i.e. the limit value is no longer exceeded or undershot). The maximum number of further dressing cycles can be limited, so that in the event of a serious error, further dressing is not carried out at will.

According to a third option, the machine operator can select whether or not to skip the damaged area (i.e. extension along the Y-axis) when grinding further gears.

According to another option, the machine operator can select whether to continue grinding normally and thus the error message is not taken into account.

Via the existing data (set shift amounts during grinding), it is possible to trace back which workpiece was machined at which shift position of the grinding worm. This enables a message to be issued to the machine operator as to which previously ground parts were ground with a damaged area and could therefore possibly be out of order.

LIST OF REFERENCES

1 Grinding worm
2 Worm thread
3 Worm thread
4 Dressing tool
5 Dressing spindle
P1 Process parameter
H1 Dressing stroke
H2 Dressing stroke
H3 Dressing stroke
Y Path of the dressing stroke
GW Limit value: minimal allowed value of the process parameters

The invention claimed is:

1. A method for dressing a multi-thread grinding worm for the grinding of toothings or similar profiles, wherein the grinding worm comprises a plurality of worm threads, each of which are dressed by means of a dressing tool with at least one dressing stroke in order to provide a desired profile to the grinding worm, wherein the method comprises the steps:

a) dressing a first worm thread with the dressing tool by at least one dressing stroke, wherein data of at least one process parameter is measured and recorded in a database during the dressing of the first worm thread;

b) dressing of a further worm thread, which is different from the first worm thread, with the dressing tool by at least one dressing stroke, wherein the process parameter is measured and recorded in a database during the dressing of the further worm thread;

c) after dressing all worm threads of the grinding worm: combining the measured and recorded data of the at least one process parameter;

d) comparing, using a machine controller, the combined data of the at least one process parameter with data stored in the machine controller and checking whether the combined data is within a predefined admissible range;

e) outputting a signal by the machine controller if the combined data is not within the predefined admissible range.

2. The method according to claim 1, wherein the dressing takes place in several dressing strokes, wherein the data measurement and data acquisition only take place for selected dressing strokes, preferably only for the last executed dressing stroke.

3. The method according to claim 1, wherein the at least one process parameter is measured and recorded over the path of the dressing stroke.

4. The method according to claim 1, wherein the process parameter is the current of a drive motor with which a dressing spindle carrying the dressing tool is driven in rotation.

5. The method according to claim 1, wherein the process parameter is the dressing work related to removed material of the grinding worm, which is required for at least a defined section of the grinding worm during a dressing stroke.

6. The method according to claim 1, wherein the process parameter is the structure-borne sound or acoustic emission detected by a structure-borne sound or acoustic sensor during a dressing stroke.

7. The method according to claim 1, wherein the combining of the measured and recorded data of the at least one process parameter according to step c) is adding of the measured and recorded data.

8. The method according to claim 1, wherein the comparison of the combined data according to step d) comprises a comparison with at least one predetermined and stored maximum or minimum value.

9. The method according to claim 8, wherein the comparison is made for a predetermined section of the grinding worm.

10. The method according to claim 1, wherein data of several process parameters are measured and recorded.

11. The method according to claim 1, wherein a characteristic value which characterizes the dressing process of the grinding worm is determined from the at least one process parameter and output.

* * * * *